United States Patent
Arroyo-Redondo et al.

(10) Patent No.: US 12,551,718 B2
(45) Date of Patent: Feb. 17, 2026

(54) ELECTROMAGNETIC AND PHOTOBIOMODULATION DEVICES FOR TREATING EYE DISORDERS AND METHODS OF USING THE SAME

(71) Applicant: Julio Cesar Arroyo-Redondo, Shenandoah, TX (US)

(72) Inventors: Julio Cesar Arroyo-Redondo, Shenandoah, TX (US); Bruce Robertson, Forestside (GB)

(73) Assignee: Julio Cesar Arroyo-Redondo, Shenandoah, TX (US)

( * ) Notice: Subject to any disclaimer, the term of this patent is extended or adjusted under 35 U.S.C. 154(b) by 1028 days.

(21) Appl. No.: 17/312,861

(22) PCT Filed: Jan. 15, 2020

(86) PCT No.: PCT/US2020/013691
§ 371 (c)(1),
(2) Date: Jun. 10, 2021

(87) PCT Pub. No.: WO2020/150358
PCT Pub. Date: Jul. 23, 2020

(65) Prior Publication Data
US 2022/0008744 A1    Jan. 13, 2022

Related U.S. Application Data (60) Provisional application No. 62/793,246, filed on Jan. 16, 2019.

(51) Int. Cl.
*A61N 5/067* (2006.01)
*A61B 5/24* (2021.01)
(Continued)

(52) U.S. Cl.
CPC .............. *A61N 5/067* (2021.08); *A61B 5/24* (2021.01); *A61N 2/02* (2013.01); *A61N 5/0613* (2013.01);
(Continued)

(58) Field of Classification Search
None
See application file for complete search history.

(56) References Cited

U.S. PATENT DOCUMENTS

| | | | |
|---|---|---|---|
| 6,102,847 A | 8/2000 | Stielau | |
| 6,142,623 A * | 11/2000 | Jones | G02C 3/003 |
| | | | 351/158 |

(Continued)

FOREIGN PATENT DOCUMENTS

| | | |
|---|---|---|
| DE | 19549297 A1 | 6/1997 |
| DE | 102011051741 A1 | 1/2012 |
| WO | 2007146342 A2 | 12/2007 |

OTHER PUBLICATIONS

Hashmi, J et al, "Role of Low-Level Laser Therapy in Neurorehabilitation"; whitepaper [online]. Dec. 1, 2011 [retrieved Mar. 9, 2020). Retrieved from the internet: ; see entire document.

(Continued)

*Primary Examiner* — Erica S Lee
(74) *Attorney, Agent, or Firm* — Emanus LLC; Willie Jacques (57) ABSTRACT

The present disclosure relates to devices for treating eye disorders, such as macular degeneration, with electromagnetic pulses and/or photobiomodulation. Examples of the devices, include wearable, portable, or mobile devices, which include a light source and a pulsed electromagnetic field emitter that are connected to or capable of connecting to a frame, such as an eye wear. Benefits of the devices disclosed herein can include a device for treating eye (Continued)

disorders, which can be self-administered by a patient or subject at home, at work, or during travel.

13 Claims, 2 Drawing Sheets

(51) Int. Cl.
  *A61N 2/02* (2006.01)
  *A61N 5/06* (2006.01)
(52) U.S. Cl.
  CPC ............ *A61N 2005/0648* (2013.01); *A61N 2005/0659* (2013.01); *A61N 2005/0663* (2013.01)

(56) References Cited

U.S. PATENT DOCUMENTS

| | | | | |
|---|---|---|---|---|
| 2004/0077921 | A1* | 4/2004 | Becker | A61N 2/008 600/9 |
| 2016/0066786 | A1* | 3/2016 | Kontiola | A61B 5/0066 600/398 |
| 2016/0067087 | A1 | 3/2016 | Tedford et al. | |
| 2017/0046342 | A1 | 2/2017 | Azgin et al. | |
| 2017/0224951 | A1 | 8/2017 | Weber et al. | |
| 2018/0169430 | A1* | 6/2018 | Kamei | A61N 5/06 |
| 2018/0214708 | A1* | 8/2018 | Laty | A61N 5/0618 |
| 2020/0360715 | A1* | 11/2020 | Lim | A61N 5/0622 |

OTHER PUBLICATIONS

ISA/US, "International Search Report and Written Opinion" for PCT/US20/13691, dated Apr. 9, 2020, 16 pages.
Jameco Electronics "LED Uni-Color Yellow 585nm 2-Pin T-1 3/4"; website [online]. Sep. 19, 2017 (retrieved Mar. 20, 2020]. Retrieved from the internet: ; pp. 1-2, overview: specifications.
Rojas, Jet Al, "Low-level light therapy of the eye and brain"; whitepaper [online]. Oct. 4, 2011 [retrieved Mar. 10, 2020). Retrieved from the internet: ; see entire document.
Zaino, L "We Tried 8 Different Sleep Masks in Search of the Best"; article [online]. Nov. 29, 2018 (retrieved Mar. 9, 2020). Retrieved from the internet: ; p. 3, paragraph 5.

* cited by examiner

ELECTROMAGNETIC AND PHOTOBIOMODULATION DEVICES FOR TREATING EYE DISORDERS AND METHODS OF USING THE SAME

TECHNICAL FIELD

The present disclosure relates to devices for treating eye disorders, such as macular degeneration, with electromagnetic field frequencies and/or photobiomodulation. Benefits of the devices disclosed herein can include a device for treating eye disorders by conveniently administering an electromagnetic pulses and/or photobiomodulation to the eyes.

BACKGROUND

Macular degeneration, also known as age-related macular degeneration (AMD or ARMD), is a medical condition or eye disorder which can result in blurred or no vision in the center of the visual field. Macular degeneration is the medical term for the deterioration of the macula, which is the small central area of the retina of the eye that controls visual acuity. These are often commonly called as "blind spots."

Macular degeneration is often considered one of the leading causes of vision loss, along with cataracts, preterm birth, and glaucoma. Around 6.5 percent of Americans age 40 and older suffer from some degree of macular degeneration. There is research suggesting that there were 9.1 million cases of early AMD in the U.S. in 2010. That number is expected to grow to about 17.8 million by 2050. Commonly attributed causes of macular degeneration range from genetics, aging, smoking, hypertension, atherosclerosis, high cholesterol, obesity, fat intake, and exposure to light, such as UV and/or blue light from the sun, and light from light emitting diodes (LEDs). There are basically two types of macular degeneration: wet macular degeneration and dry macular degeneration. Wet macular degeneration is generally diagnosed when angiography can visualize the leakage of a bloodstream behind the macula. Dry macular degeneration is generally diagnosed when tests indicate that macular degeneration is present and no leakage of leakage of bloodstream behind the macula has been detected. The therapies available regimens for wet macular degeneration include drugs, such as ranibizumab and aflibercept; photodynamic therapy in conjunction with verteporfin; surgery; or just learning to adapt to the disorder by training subjects to see with the remaining healthy parts of the eye. In other words, current treatments are so ineffective that no standard treatment has been identified, leaving patients and health care providers to figure out the best way to proceed by trial and error. However, at least there are treatments for wet macular degeneration. In contrast, dry macular degeneration does not appear to have any accepted medical or surgical treatment.

There is a need for devices and methods for treating dry macular degeneration. There is a need for portable and/or wearable devices for treating eye disorders, including macular degeneration, which allows patients to conveniently and cost-effectively apply a treatment regimen for eye disorders. There is a need for medical devices and methods for treating eye disorders, including wet and dry macular degeneration, which is non-invasive and does not require drugs.

SUMMARY

The present disclosure relates to a device. In an embodiment, the device includes a light source and a pulsed electromagnetic field emitter connected to a frame, wherein the frame can position the light source to emit light into an eye, and wherein the frame can position the pulsed electromagnetic field emitter from about 5 mm to about 40 mm from the eye. In an embodiment of the device, the light source includes at least one of a yellow light source capable of emitting light from about 580 nm to about 600 nm, a red light source capable of emitting light from about 620 nm to about 640 nm, a deep red light source capable of emitting light from about 720 nm to about 760 nm, and a near infrared light source capable of emitting light from about 860 nm to about 900 nm. In an embodiment of the device, the yellow light source is capable of emitting light at from about 5 to about 20 millicandela or from about 0.0018 lumens to about 0.0075 lumens; wherein the red light source is capable of emitting light at from about 5 to about 20 millicandela or from about 0.0042 lumens to about 0.0168 lumens; wherein the deep red light source is capable of emitting light at from about 5 mw to about 20 mw with an included angle of 170 degrees; or the near infrared light source is capable of emitting light at from about 0.1 mw/cm$^2$ to about 0.8 mw/cm$^2$ with an included angle of 24 degrees. In an embodiment of the device, the light source includes at least one of a plasma display, a liquid crystal display, a light emitting diode, an organic light emitting diode, a super luminous diode, and a low level laser. In an embodiment of the device, the light source is capable emitting pulsed light into the eye at a frequency from about 30 Hz to about 166 Hz. In an embodiment of the device, the light source is connected to a pulse width modulation generator and a microcontroller chip. In an embodiment of the device, the pulsed electromagnetic field emitter is capable emitting a magnetic frequency from about 2.58 Hz to about 100 Hz or about 2 µT to about 100 µT. In an embodiment, the device includes a bio-resonance emitter connected to the frame, wherein the frame can position the bio-resonance emitter from about 5 mm to about 40 mm from the eye and the bio-resonance emitter is capable of detecting electromagnetic waves from the eye and emitting electromagnetic waves in response to detected electromagnetic waves from the eye. In an embodiment, the device is a wearable device, weighing from about 2.0 g to about 680 g. In an embodiment of the device, the light source and the pulsed electromagnetic field emitter are connected by a wearable frame. In an embodiment, the device is an eyewear, a headwear, a headset, or a body wear. Benefits of the devices disclosed herein can include a device for treating eye disorders, which can be self-administered by a patient or subject at home, at work, or during travel.

A method of treating an eye disorder in a subject in need thereof is disclosed herein. In an embodiment, the method includes providing a device, wherein the device includes a light source and a pulsed electromagnetic field emitter connected to a frame, wherein the frame can position the light source to emit light into an eye, and the frame can position the pulsed electromagnetic field emitter from about 5 mm to about 40 mm from the eye; emitting light from the light source into an eye of the subject at a light wavelength and a light pulse frequency for a light duration; and emitting an electromagnetic pulse from the pulsed electromagnetic field emitter for an electromagnetic frequency and an electromagnetic duration. In an embodiment of the method, the light wavelength is at least one of from about 580 nm to about 600 nm, from about 620 nm to about 640 nm, from about 720 nm to about 760 nm, and from about 860 nm to about 900 nm. In an embodiment of the method, the light pulse frequency is from about 30 Hz to about 166 Hz. In an embodiment of the method, the light duration is from about 1 minute to about 30 minutes. In an embodiment of the method, the electromagnetic frequency is from about 2.58 Hz to about 100 Hz, or the electromagnetic duration is from about 1 minute to about 40 minutes. In an embodiment of the method, the eye disorder includes at least one of macular degeneration, eye fatigue, an intraocular pressure imbalance, an eye blood flow or circulation disorder, retinal degenerative disease, and retinal vascular disease.

In an embodiment, the method includes emitting light from a light source into an eye of the subject at a light wavelength and a light pulse frequency for a light duration; and emitting an electromagnetic pulse from a pulsed electromagnetic field emitter located from about 5 mm to about 40 mm from the eye for an electromagnetic frequency and an electromagnetic duration, wherein the light wavelength is at least one of from about 580 nm to about 600 nm, from about 620 nm to about 640 nm, from about 720 nm to about 760 nm, and from about 860 nm to about 900 nm; the light pulse frequency is from about 30 Hz to about 166 Hz; or the light duration is from about 1 minute to about 30 minutes; wherein the electromagnetic frequency is from about 2.58 Hz to about 100 Hz, or the electromagnetic duration is from about 1 minute to about 40 minutes. In an embodiment, the method includes providing a device, wherein the device includes at least one of a light source, a pulsed electromagnetic field emitter, and a bio-resonance emitter connected to a frame, wherein the frame can position the light source to emit light into an eye; wherein the frame can position the pulsed electromagnetic field emitter and the bio-resonance emitter from about 5 mm to about 40 mm from the eye; or the eye disorder includes at least one of macular degeneration, eye fatigue, an intraocular pressure imbalance, an eye blood flow or circulation disorder, retinal degenerative disease, and retinal vascular disease.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. The drawings are not to scale.

DETAILED DESCRIPTION

One of the causes of macular degeneration is commonly attributed to exposure of the retina of the eye to specific wavelengths from artificial light, such as artificial lighting emitters including but not limited to fluorescent lights, incandescent bulbs, lasers, light emitting diodes (LEDs), and the like. Macular degeneration is already one of the leading causes of vision loss, and that was before people started spending most of their days staring at displays for TVs, computers, and mobile devices. Most researchers have focused on non-invasive treatments, such as administering pharmaceutical compositions, and invasive treatments, such as surgery. Lower cost treatments have even focused on training patients to use the undamaged parts of their eyes to see.

It has been surprisingly discovered that the application of photobiomodulation to retina of one or both eyes can actually reverse macular degeneration. It is highly counterintuitive that shining light into the eyes of a patient could actually treat and repair damage commonly attributed to shining light into the eyes. However, it has been discovered that directing certain wavelength-specific and controlled light into the eyes of a subject or patient can actually stimulate healing of the retina in the patient. Further, it has been discovered that administering controlled electromagnetic pulses in close proximity to the eyes can also stimulate healing of the retina.

The areas of photobiomodulation, pulsed electromagnetic therapy, and bio-resonance are not new. However, these areas of research and therapy are often derided as alternative therapies, dismissed by the mainstream medical community, or worse, accused of being fake science and quackery. Moreover, the application of these therapies has been limited because the traditional devices to apply them are so large and expensive that patients are required to receive treatment sessions on-site at a medical facility. This requirement is especially burdensome to patients because therapies of this type often require frequent sessions to be effective.

The present disclosure relates to a device which is mobile, wearable, or portable such that it allows for the safe, convenient treatment of patients at work or home with a combination of photo-biomodulation, pulsed electromagnetic therapy, and/or bio-resonance. Despite the medical community's dismissal of photobiomodulation, pulsed electromagnetic therapy, and bio-resonance, it has been discovered that these methods are capable of providing patients with successful treatments for eye disorders. Moreover, preliminary results indicate that the present medical devices, and methods of using the device, are capable of treating dry age-related macular degeneration for which, it is believed, there is no current effective treatment.

Figure 1A:
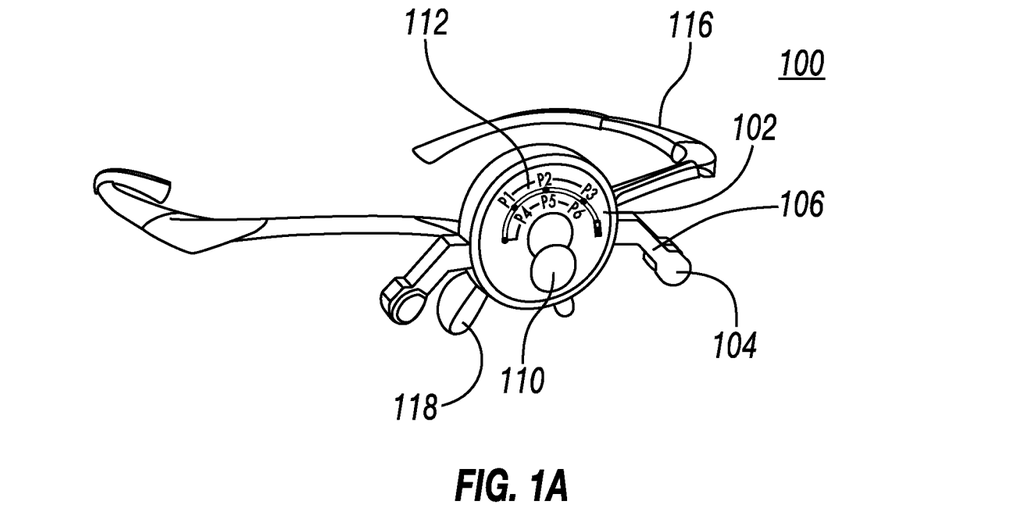
FIG. 1A is a schematic depiction of an embodiment of a device, as disclosed herein, shown from the front.
Figure 1B:
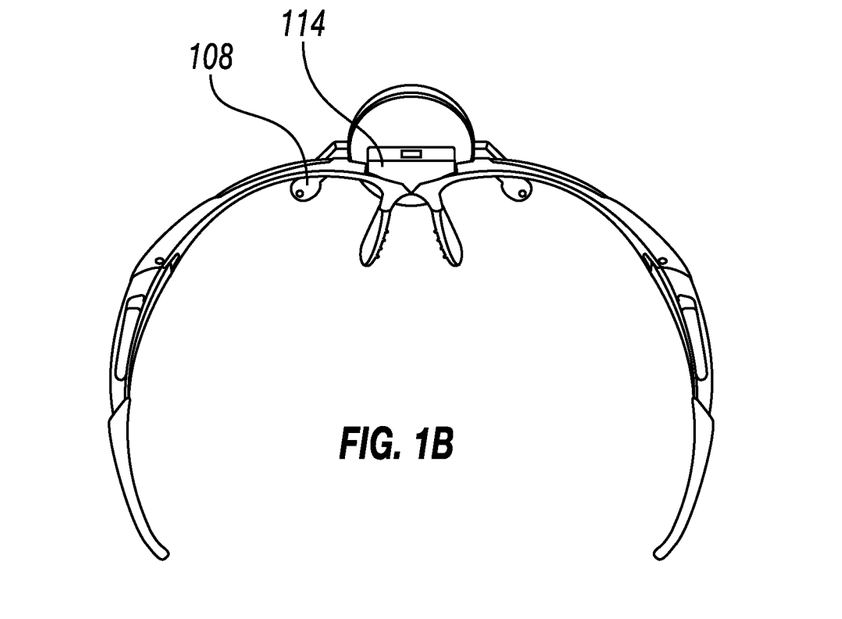
FIG. 1B is a schematic depiction of an embodiment of the device shown in FIG. 1A, shown from behind.

The present disclosure relates to a device, including a medical device, including a device for treating an eye disorder in a subject in need thereof. Referring to FIG. 1A and FIG. 1B, in an embodiment, the device 100 includes a device controller 102, wherein the device controller can be operatively connected to a light source housing 104 by a light source positioner 106, wherein the light source housing 104 contains a light source 108. In an embodiment, the device controller 102 has a device input 110 and device display 112 located on a front surface or outside surface of the device controller. In an embodiment, the device and/or device controller 102 can be mounted on a frame 116 by an attachment mechanism 114. In an embodiment, the frame 116 may have one or more pads 118 for mounting the device on the bridge of the nose.

Figure 2:
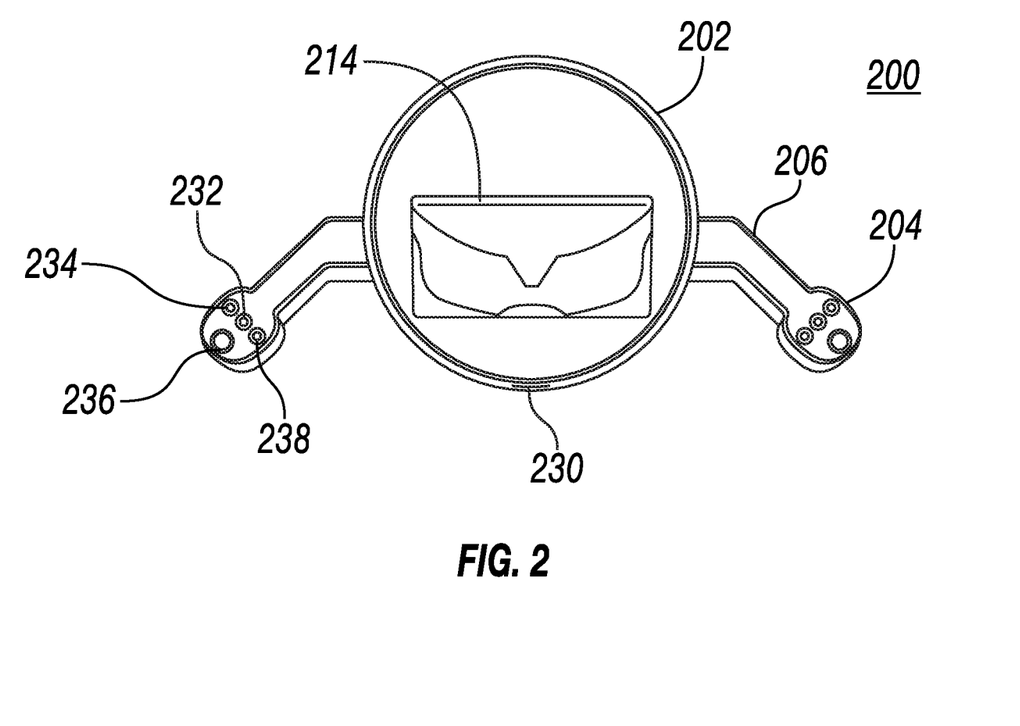
FIG. 2 is a schematic depiction of an embodiment of the device shown in FIG. 1A and FIG. 1B, wherein the frame has been removed from the light source and pulsed magnetic emitter.

Referring to FIG. 2, in an embodiment, the device 200 can include a device controller 202 operatively connected to light source housing 204 by a light source positioner 206, wherein the light source housing 204, contains a yellow light source 232, a red light source 234, a deep red light source 236, and a near infrared light source 238. It is understood that the position of light sources 232, 234, 236, and 238 are modular and interchangeable. In an embodiment, the device 200 can include an attachment mechanism 214, wherein the attachment mechanism is capable of mounting the device on a frame, such as a pair of glasses. In an embodiment, the device can have a port 230, such as a power port or universal serial bus (USB) port, located on an outer surface of the device 200. The embodiment of the device schematically depicted in FIG. 2, is the same device depicted in FIGS. 1A and 1B, except the frame has been removed and the depiction has been magnified.

Figure 3:
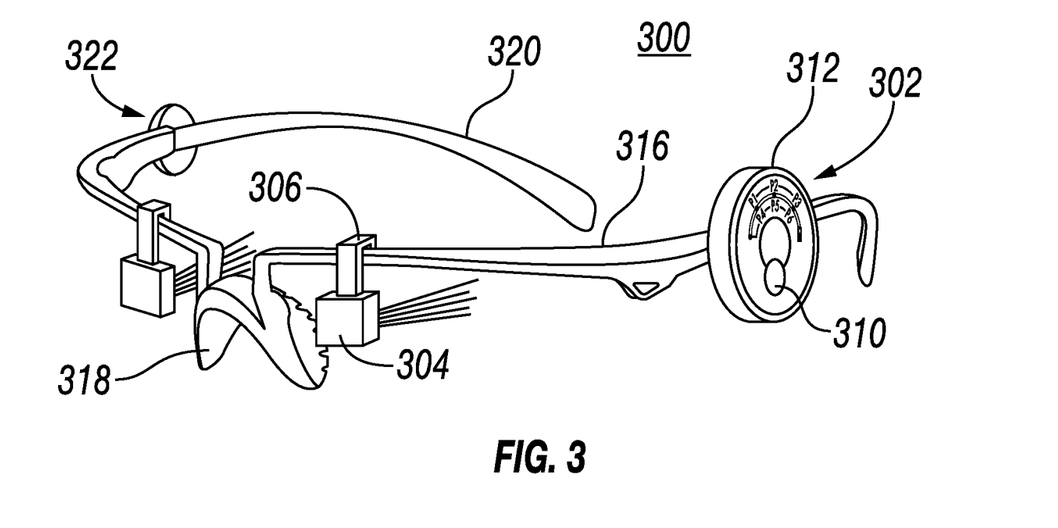
FIG. 3 is a schematic depiction of an embodiment of a device, as disclosed herein.

Referring to FIG. 3, in an embodiment, the device 300 can include a device controller 302, wherein the device controller can be operatively connected to a light source housing 304 by a light source positioner 306. In an embodiment, the device controller 302 has a device input 310 and device display 312 located on a front surface or outside surface of the device controller. In an embodiment, the device 300 can include a frame 316, wherein the frame 316 may have one or more pads 318 for mounting the device on the bridge of the nose and one or two temples 320. In an embodiment, the device 300 can also have an auxiliary piece 322.

In an embodiment, the device includes a light source connected to a device controller. In embodiment, the light source can be a single or lone light source. In an embodiment, the single or lone light source can emit a single range or non-variable range of wavelengths of light. In an embodiment, the single or lone light source can be adjusted to change the range of wavelengths of light. In an embodiment, the light source can include from 1, 2, 3, 4, 5, and/or 6 separate or independent light sources. In an embodiment, the light source can having 2, 3, 4, 5, or 6 light sources, wherein at least two of the light sources can emit light having a range of wavelengths which differs by from about 20 nm to 100 nm. In an embodiment, the light source can be located in the light source housing. In an embodiment, the light source housing and light source can be positioned by the light source positioner to direct light into an eye of a subject.

In an embodiment, the light source can include a plasma display, a liquid crystal display, an electroluminescent bulb, an organic light emitting diode (OLED), a neon bulb, a low level laser, a super luminescent light emitting diode (SLED), a light emitting diode (LED), or any combination of such light sources. In an embodiment, 1, 2, 3, 4, 5, and/or 6 of the light sources can be light emitting diode, including an organic light emitting diode, a light emitting diode, or super luminescent diode. The choice of light source is not limited so long as the light source is capable of providing light of acceptable ranges of wavelengths and intensity, as discussed herein.

In general, the purpose of the light source is to direct light into an eye of a subject to stimulate healing. To stimulate healing and avoid damaging the eye, the light source can direct light into the eye of a subject at a controlled wavelength and intensity. In an embodiment, the light source includes at least one of a yellow light source capable of emitting light from about 580 nm to about 600 nm, including from about 585 nm to about 595 nm. In an embodiment, the light source includes at least one of a yellow light source capable of emitting light at from about 5 to about 20 millicandela, including from about 8 to about 17 millicandela. In an embodiment, the light source includes at least one of a yellow light source capable of emitting light at from about 0.0018 lumens to about 0.0075 lumens, including from about 0.0025 lumens to about 0.0060 lumens.

In an embodiment, the light source includes at least one of a red light source capable of emitting light from about 620 nm to about 640 nm, including from about 625 nm to about 635 nm. In an embodiment, the light source includes at least one of a red light source capable of emitting light at from about 5 to about 20 millicandela (mcd), including from about 8 to about 17 millicandela. In an embodiment, the light source includes at least one of a red light source capable of emitting light from about 0.0042 lumens to about 0.0168 lumens, including from about 0.0060 lumens to about 0.0140 lumens.

In an embodiment, the light source includes at least one of a deep red light source capable of emitting light from about 720 nm to about 760 nm, including from about 730 nm to about 750 nm. In an embodiment, the light source includes at least one of a deep red light source capable of emitting light at from about 5 mW to about 20 mW, including about 8 mW to about 18 mW, with an included angle of 170 degrees.

In an embodiment, the light source includes at least one of a near infrared light source capable of emitting light from about 860 nm to about 900 nm, including from about 870 nm to about 890 nm. In an embodiment, the light source includes at least one of a near infrared light source capable of emitting at from about 0.1 mW/cm$^2$ to about 0.8 mW/cm$^2$, including from about 0.2 mW/cm$^2$ to about 0.7 mW/cm$^2$, with an included angle of 24 degrees. If the light source emits a wavelength above or below the ranges described, then it is not clear if the same beneficial results will be obtained. If the intensity goes above the ranges described above, then there may be damage to the eye. If the intensity goes below the ranges described above, then the beneficial results may not be obtained.

In addition to emitting light at controlled or acceptable ranges of wavelength and intensity, the light source of the device can also emit light at controlled frequencies and durations. In an embodiment, the light source is capable emitting pulsed light into the eye at a frequency from about 30 Hz to about 166 Hz. In an embodiment, the device includes a yellow light source that is capable of emitting light with a pulsed frequency of from about 30 Hz and about 101 Hz, including from about 40 Hz and about 85 Hz, including for a duration of about 1.3 to about 4 minutes. In an embodiment, the device includes a red light source that is capable of emitting light with a pulsed frequency of from about 30 Hz and about 100 Hz, including from about 40 Hz and about 85 Hz, including for a duration of about 1.3 to about 3 minutes. In an embodiment, the device includes a deep red light source that is capable of emitting light with a pulsed frequency of from about 30 Hz and about 166 Hz, including from about 40 Hz and about 140 Hz, including for a duration of about 1.3 to about 3 minutes. In an embodiment, the device includes a near infrared light source that is capable of emitting with a pulsed frequency of from about 30 Hz and about 100 Hz, including from about 40 Hz and about 80 Hz, including for a duration of about 1.3 to about 3 minutes. Without wishing to be bound by theory, it is believed that pulsing light from the light source as it is directed into the eye can stimulate healing in the eye while avoiding the harmful effects of directing light into the eye for prolonged periods of time. If the frequency falls below the ranges described above, then the likelihood of photo induced epilepsy is increased. If the frequency goes above the ranges described above, then the beneficial effects may be lost or decreased.

In an embodiment, the device includes a light source housing. In an embodiment, the purpose of the light source housing is to position the one or more light sources to direct light into the eye. In an embodiment the light source housing contains a cluster of 2, 3, 4, 5, and/or 6 light sources capable of, simultaneously or in any sequence, emitting light from the light source into the eye. Many light sources, when used alone, do not have the ability to provide all of the wavelengths of light needed for therapy in a cost effective manner. Instead, it can be beneficial to use different light sources to provide light at different ranges of wavelength and intensity. In an embodiment, a benefit of the light source housing can be holding one or more light sources close together such they each can emit light into an eye of a patient simultaneously or in any order.

In an embodiment, the device include a light source connector. In an embodiment, the purpose of the light source connector is to operatively connect the light source or light sources located in the light source housing with the device controller. The term "operatively connect" as used herein means connected in a manner capable of passing at least one of power or signals between the objects connected. In an embodiment, the purpose of the light source connector is to connect and position the light source and/or light source housing relative to a frame or attachment mechanism to allow for light to be directed into the eye of a subject. In an embodiment, the light source housing and light source connector are connected by and/or made of a single material, such as plastic.

In an embodiment, the device includes a device controller. In an embodiment, the device controller contains at least one of a pulse width modulation generator, a circuit board, a microcontroller chip, a pulsed electromagnetic field emitter, and a bio-resonance emitter, or combinations thereof.

In embodiment of the device, the device controller includes or contains a pulse width modulation generator. In an embodiment, the pulse width modulation generator provides electrical pulses to the light source or light sources, such that light sources emit light with a frequency or range of frequency as disclosed therein. The pulse width modulation generator is not generally limited and are available commercially.

In an embodiment, the device includes a pulsed electromagnetic field (PEMF) emitter. In an embodiment, the device controller includes or contains a pulsed electromagnetic field (PEMF) emitter. In an embodiment, the pulsed electromagnetic field emitters includes a tuned inductor circuit capable of emitting electromagnetic pulses. In an embodiment, the pulsed electromagnetic field emitter is capable emitting a magnetic frequency from about 2.58 Hz to about 101 Hz, including from about 9.8 Hz to about 90 Hz. In an embodiment, the pulsed electromagnetic field emitter is capable emitting at a magnetic field strength of about 2 µT to about 100 µT, including from about 10 µT to about 90 µT. In an embodiment, the PEMF emitter applies an electrical pulse of 28 micro seconds to generate a 1st order decaying oscillating magnetic field with 90% decay in 1 milli second. In an embodiment, the maximum peak magnetic flux density is around 100 microTeslas (µT). In embodiment, the PEMF emitter can provide an electromagnetic field for a duration of from 1 minute to 1 hour. The pulsed electromagnetic field emitter is not generally limited and are available commercially.

In an embodiment, the device includes a bio-resonance emitter. In an embodiment, the device controller includes or contains a bio-resonance emitter. In an embodiment, the bio-resonance emitter is capable of detecting electromagnetic waves from the body, including the eye, and emitting electromagnetic waves in response to detected electromagnetic waves from the body, including the eye. In an embodiment, the bio-resonance emitter includes an oscillator capable of generating a magnetic field. In an embodiment, the bio-resonance emitter can emit electromagnetic waves with a frequency and strength that overlaps with the frequency and strength of the electromagnetic waves produced by the human body, including the eye. In an embodiment, the bio-resonance emitter is different from and/or separate from the PEMF emitter. In an embodiment, the bio-resonance emitter is part of the PEMF emitter. In an embodiment, the bio-resonance emitter detects electromagnetic waves from the subject's body, including the subject's eye, and modulates or adjusts the electromagnetic field emitted by the PEMF emitter in response to the waves from the subject's body. The bio-resonance emitter is not generally limited and is commercially available.

In an embodiment, at least one of the pulse width modulation generator, a microcontroller chip, a pulsed electromagnetic field emitter, and a bio-resonance emitter are mounted on a circuit board located inside of the device controller. In an embodiment, the microcontroller chip can run standard or custom software programs to control at least one of at the pulse width modulation generator, a pulsed electromagnetic field emitter, and a bio-resonance emitter. The circuit board, the microcontroller chip, and software programs are not generally limited and are commercially available.

In an embodiment, the device controller includes a device input. In an embodiment, the device controller includes a device display. In an embodiment, the device input includes one or more buttons, keys, switches, or dials, which are capable of being manually operated. In an embodiment, the device display includes one or more indicators, including indicator lights. In an embodiment, the micro controller can cause an indicator light to glow or blink as an indication of the status of the device. For example, one or more indicator lights may glow or blink to indicate the power level of the device or indicate which program is or has been selected. In an embodiment, the device controller can have a touch screen, such that the device input and display are combined and operated in a manner similar to a touch screen watch. In an embodiment, the device controller can exclude a device input or device display in contact with the device controller. In an embodiment, the device controller can contain a communication device capable of operating the device controller remotely using a common electronic device such as remote control, computer, tablet, cellphone, or other mobile device or touch screen device.

The device can include an attachment mechanism. The attachment mechanism is not generally limited so long as the attachment mechanism is capable of attaching the device to a frame. In an embodiment, the attachment mechanism can reversibly or permanently attach the device to a frame, including a wearable frame, including an eyewear, a headwear, a headset, or a body wear. In an embodiment, the attachment mechanism includes a clasp, nut and/or bolt, a hook and loop fastener, a permanent adhesive or a reversible adhesive.

In an embodiment, the device includes a light source and a pulsed electromagnetic field emitter, and optionally a bio-resonance emitter. In an embodiment, the device includes a light source and a pulsed electromagnetic field emitter, and optionally a bio-resonance emitter, connected to a frame. In an embodiment, the device is a wearable device, weighing from about 2.0 g to about 680 g, including from about 5.0 g to about 500 g. In an embodiment, the frame is not generally limited so long as the frame can position the light source to direct light into the an eye of the subject, and hold the light source steady during operation. In an embodiment, the frame is not generally limited so long as the frame can position the pulsed electromagnetic field emitter, and optionally bio-resonance emitter, from about 5 mm to about 40 mm from the eye, including from about 8 to about 30 mm from the eye. If the frame cannot position the light source to direct light into an eye of the subject, then the therapeutic benefits of the light source may be lost. If the frame positions the light source closer than 5 mm to the eye, then the positioning of the device controller tends to interfere directing light into the eye and can also irritate the subject. If the device positions the light source further than 40 mm from the eye, then the therapeutic benefits of the PEMF and/or bio-resonance emitter will be lost or reduced to an unacceptable level. In an embodiment, the frame is a wearable frame, such that it is capable of being mounted or worn on the body. In an embodiment the device is, includes, or is part of an eyewear, a headwear, a headset, or a body wear. For example, the device can be mounted or connected to a traditional pair of glasses, where the lenses may or may not have been removed.

In an embodiment, the device can exclude frame. In an embodiment, the device can include a light source, a pulsed electromagnetic field emitter, and a bio-resonance emitter, wherein the device includes an attachment mechanism. In an embodiment, the attachment mechanism can reversibly or permanently attach or bind the device to a wearable frame. For example, the device can be attached to a commercially available pair of glass, where the lenses have or have not been removed. In an embodiment, a benefit of the device excluding a frame can be the easy, cost-effective integration of the device with a commercially available frame or wearable frame, such as commercially available glasses, goggles, or other eye wear, which can reduce costs.

In an embodiment, the device include a pulsed electromagnetic field emitter and/or a bio-resonance emitter, wherein the device can exclude a light source or include a single light source. In embodiment, the device can be attached by the attachment mechanism to a wearable frame, wearable medical device, or wearable display. For example, the device can be attached by the attachment mechanism to a wearable display, such as LED glass, smart glasses, a virtual reality headset, a virtual reality frame, virtual reality glasses and similar device known to those of skill in the art. In an embodiment, a benefit of a device that excludes a light source can be easy integration with a commercially available device which contains an acceptable light source and device controller, such as wearable display or wearable medical device. The ability to integrate an embodiment of the device with another wearable device that contains a light source can reduce costs.

A method of treating an eye disorder is disclosed herein. In an embodiment, the method includes treating an eye disorder in a subject in need thereof. In an embodiment, the method includes providing a device, wherein the device includes a light source and a pulsed electromagnetic field emitter, and optionally a bio-resonance emitter, connected to a frame; and emitting light from the light source into an eye of the subject at a light wavelength and a light pulse frequency for a light duration. In an embodiment, the method includes emitting an electromagnetic pulse from the pulsed electromagnetic field emitter for an electromagnetic frequency and an electromagnetic duration. In an embodiment, the providing the device can include any embodiment of the device disclosed herein.

In an embodiment, the method includes emitting light from the light source into an eye of the subject at a light wavelength. In an embodiment of the method, the light wavelength can include at least one of from about 580 nm to about 600 nm, from about 620 nm to about 640 nm, from about 720 nm to about 760 nm, and from about 860 nm to about 900 nm. In an embodiment of the method, the light wavelength can include yellow light from about 580 nm to about 600 nm, including from about 585 nm to about 595 nm. In an embodiment of the method, the yellow light emitted can have intensity from 5 to about 20 millicandela, including from about 8 to about 17 millicandela. In an embodiment, the yellow light emitted ranges from about 0.0018 lumens to about 0.0075 lumens, including from about 0.0025 lumens to about 0.0060 lumens. In an embodiment of the method, the light wavelength can include a red light from about 620 nm to about 640 nm, including from about 625 nm to about 635 nm. In an embodiment of the method, the yellow light emitted can range from about 5 to about 20 millicandela (mcd), including from about 8 to about 17 millicandela. In an embodiment of the method, the yellow light emitted can range from about 0.0042 lumens to about 0.0168 lumens, including from about 0.0060 lumens to about 0.0140 lumens. In an embodiment of the method, the light wavelength can include deep red light from about 720 nm to about 760 nm, including from about 730 nm to about 750 nm. In an embodiment of the method, the deep red light emitted can range from about 5 mW to about 20 mW, including about 8 mW to about 18 mW, with an included angle of 170 degrees. In an embodiment of the method, the light wavelength can include near infrared light from about 860 nm to about 900 nm, including from about 870 nm to about 890 nm. In an embodiment of the method, the near infrared light emitted can range from about 0.1 mw/cm$^2$ to about 0.8 mW/cm$^2$, including from about 0.2 mW/cm$^2$ to about 0.7 mW/cm$^2$, with an included angle of 24 degrees. If the wavelength passes above or below the ranges described, then it is not clear if the same beneficial results will be obtained. If the intensity goes above the ranges described above, then there may damage the eye. If the intensity goes below the ranges described above, then the beneficial results may not be obtained.

In an embodiment, the method includes emitting light from the light source into an eye of the subject at a light pulse frequency for a light duration. In an embodiment, the method includes emitting pulsed light into the eye at a frequency from about 30 Hz to about 166 Hz. In an embodiment, the method includes emitting pulsed light into the eye, including yellow light at a pulsed frequency of from about 30 Hz and about 101 Hz, including from about 40 Hz and about 85 Hz, including for a duration of about 1.3 to about 4 minutes. In an embodiment, the method includes emitting pulsed light into the eye, including red light at from about 30 Hz and about 100 Hz, including from about 40 Hz and about 85 Hz, including for a duration of about 1.3 to about 3 minutes. In an embodiment, the method includes emitting pulsed light into the eye including deep red light at from about 30 Hz and about 166 Hz, including from about 40 Hz and about 140 Hz, including for a duration of about 1.3 to about 3 minutes. In an embodiment, the method includes emitting pulsed light into the eye including deep near infrared light at from about 30 Hz and about 100 Hz, including from about 40 Hz and about 80 Hz, including for a duration of about 1.3 to about 3 minutes. Without wishing to be bound by theory, it is believed that pulsing light from the light source as it is directed into the eye can stimulate healing in the eye while avoiding the harmful effects of directing light into the eye for prolonged periods of time. If the frequency falls below the ranges described above, then the likelihood of photo induced epilepsy is increased. If the frequency goes above the ranges described above, then the beneficial effects may be lost or decreased.

In an embodiment, the method includes emitting an electromagnetic pulse from the pulsed electromagnetic field emitter for an electromagnetic frequency and an electromagnetic duration. In an embodiment of the method, the electromagnetic pulse frequency emitted can include from about 2.58 Hz to about 101 Hz, including from about 9.8 Hz to about 90 Hz. In an embodiment of the method, the electromagnetic pulse emitted can include a magnetic field strength from about 2 µT to about 100 µT, including from about 10 µT to about 90 µT. In an embodiment, the electromagnetic pulse can be emitted for a duration of from 1 minute to 1 hour, from about 2 minute to about 40 minutes, including from about 3 minute to about 15 minutes.

In an embodiment of the method, the method can include a course or series of treatments. In an embodiment, the method is applied from one to four times daily for a period of from 1 to 12 weeks. In an embodiment, the method is applied for a first course of treatment, treatment is discontinued for a period of time, and the treatment is resumed for at least a second course of treatment. In an embodiment, the treatment is discontinued for a period of days, weeks, one month, two months, three months, or longer. In an embodiment, the course of treatment is applied at a treatment frequency, and for a total number of applications sufficient to provide therapeutic benefit.

What is claimed is:

1. A device comprising:
   a light source and a pulsed electromagnetic field emitter connected to a frame,
   wherein the frame is configured to position the light source to emit light into an eye, and
   wherein the frame is configured to position the pulsed electromagnetic field emitter from about 5 mm to about 40 mm from the eye;
   wherein the light source includes at least one of a yellow light source configured to emit light from about 580 nm to about 600 nm, a red light source configured to emit light from about 620 nm to about 640 nm, a deep red light source configured to emit light from about 720 nm to about 760 nm, and a near infrared light source configured to emit light from about 860 nm to about 900 nm;
   wherein the yellow light source is configured to emit light at from about 5 to about 20 millicandela or from about 0.0018 lumens to about 0.0075 lumens; wherein the red light source is configured to emit light at from about 5 to about 20 millicandela or from about 0.0042 lumens to about 0.0168 lumens; wherein the deep red light source is configured to emit light at from about 5 mw to about 20 mw with an included angle of 170 degrees; or the near infrared light source is configured to emit light at from about 0.1 mw/cm2 to about 0.8 mw/cm2 with an included angle of 24 degrees.

2. The device of claim 1, wherein the light source includes at least one of a plasma display, a liquid crystal display, a light emitting diode, an organic light emitting diode, a super luminous diode, and a low level laser.

3. The device of claim 1, wherein the light source is configured to emit pulsed light into the eye at a frequency from about 30 Hz to about 166 Hz.

4. The device of claim 1, wherein the light source is connected to a pulse width modulation generator and a microcontroller chip.

5. The device of claim 1, wherein the pulsed electromagnetic field emitter is configured to emit a magnetic frequency from about 2.58 Hz to about 100 Hz or about 2 µT to about 100 µT.

6. The device of claim 1, wherein the device further includes a bio-resonance emitter connected to the frame, wherein the frame configured to position the bio-resonance emitter from about 5 mm to about 40 mm from the eye and the bio-resonance emitter is configured to detect electromagnetic waves from the eye and emit electromagnetic waves in response to detected electromagnetic waves from the eye.

7. The device of claim 1, wherein the device is a wearable device, weighing from about 2.0 g to about 680 g.

8. The device of claim 1, wherein the device is an eyewear, a headwear, a headset, or a body wear.

9. A method of treating an eye disorder in a subject, comprising:
   providing a device, wherein the device includes a light source and a pulsed electromagnetic field emitter connected to a frame, wherein the frame is configured to position the light source to emit light into an eye, and the frame is configured to position the pulsed electromagnetic field emitter from about 5 mm to about 40 mm from the eye;
   emitting light from the light source into an eye of the subject at a light wavelength and a light pulse frequency for a light duration; and
   emitting an electromagnetic pulse from the pulsed electromagnetic field emitter for an electromagnetic frequency and an electromagnetic duration;
   wherein the light source includes at least one of a yellow light source configured to emit light at a light wavelength from about 580 nm to about 600 nm, a red light source configured to emit light at a light wavelength from about 620 nm to about 640 nm, a deep red light source configured to emit light at a light wavelength from about 720 nm to about 760 nm, and a near infrared light source configured to emit light at a light wavelength from about 860 nm to about 900 nm;
   wherein the yellow light source is configured to emit light at from about 5 to about 20 millicandela or from about 0.0018 lumens to about 0.0075 lumens; wherein the red light source is configured to emit light at from about 5 to about 20 millicandela or from about 0.0042 lumens to about 0.0168 lumens; wherein the deep red light source is configured to emit light at from about 5 mw to about 20 mw with an included angle of 170 degrees; or the near infrared light source is configured to emit light at from about 0.1 mw/cm2 to about 0.8 mw/cm2 with an included angle of 24 degrees.

10. The method of claim 9, wherein the light pulse frequency is from about 30 Hz to about 166 Hz; or the light duration is from about 1 minute to about 30 minutes.

11. The method of claim 9, wherein the electromagnetic frequency is from about 2.58 Hz to about 100 Hz, or the electromagnetic duration is from about 1 minute to about 40 minutes; or the eye disorder includes at least one of macular degeneration, eye fatigue, an intraocular pressure imbalance, an eye blood flow or circulation disorder, retinal degenerative disease, and retinal vascular disease.

12. A method of treating an eye disorder in a subject, comprising:
   emitting light from a light source into an eye of the subject at a light wavelength and a light pulse frequency for a light duration; and
   emitting an electromagnetic pulse from a pulsed electromagnetic field emitter located from about 5 mm to about 40 mm from the eye for an electromagnetic frequency and an electromagnetic duration,
   wherein the light wavelength is at least one of a yellow light source configured to emit light from about 580 nm to about 600 nm, a red light source configured to emit light from about 620 nm to about 640 nm, a deep red light source configured to emit light from about 720 nm to about 760 nm, a near infrared light source configured to emit light from about 860 nm to about 900 nm;

the light pulse frequency is from about 30 Hz to about 166 Hz; or the light duration is from about 1 minute to about 30 minutes;

wherein the electromagnetic frequency is from about 2.58 Hz to about 100 Hz, or the electromagnetic duration is from about 1 minute to about 40 minutes;

wherein the yellow light source is configured to emit light at from about 5 to about 20 millicandela or from about 0.0018 lumens to about 0.0075 lumens; wherein the red light source is configured to emit light at from about 5 to about 20 millicandela or from about 0.0042 lumens to about 0.0168 lumens; wherein the deep red light source is configured to emit light at from about 5 mw to about 20 mw with an included angle of 170 degrees; or the near infrared light source is configured to emit light at from about 0.1 mw/cm2 to about 0.8 mw/cm2 with an included angle of 24 degrees.

13. The method of claim 12, further comprising:
providing a device, wherein the device includes at least one of a light source, a pulsed electromagnetic field emitter, and a bio-resonance emitter connected to a frame, wherein the frame is configured to position the light source to emit light into an eye;

wherein the frame is configured to position the pulsed electromagnetic field emitter and the bio-resonance emitter from about 5 mm to about 40 mm from the eye; or the eye disorder includes at least one of macular degeneration, eye fatigue, an intraocular pressure imbalance, an eye blood flow or circulation disorder, retinal degenerative disease, and retinal vascular disease.

* * * * *